Figure 1:
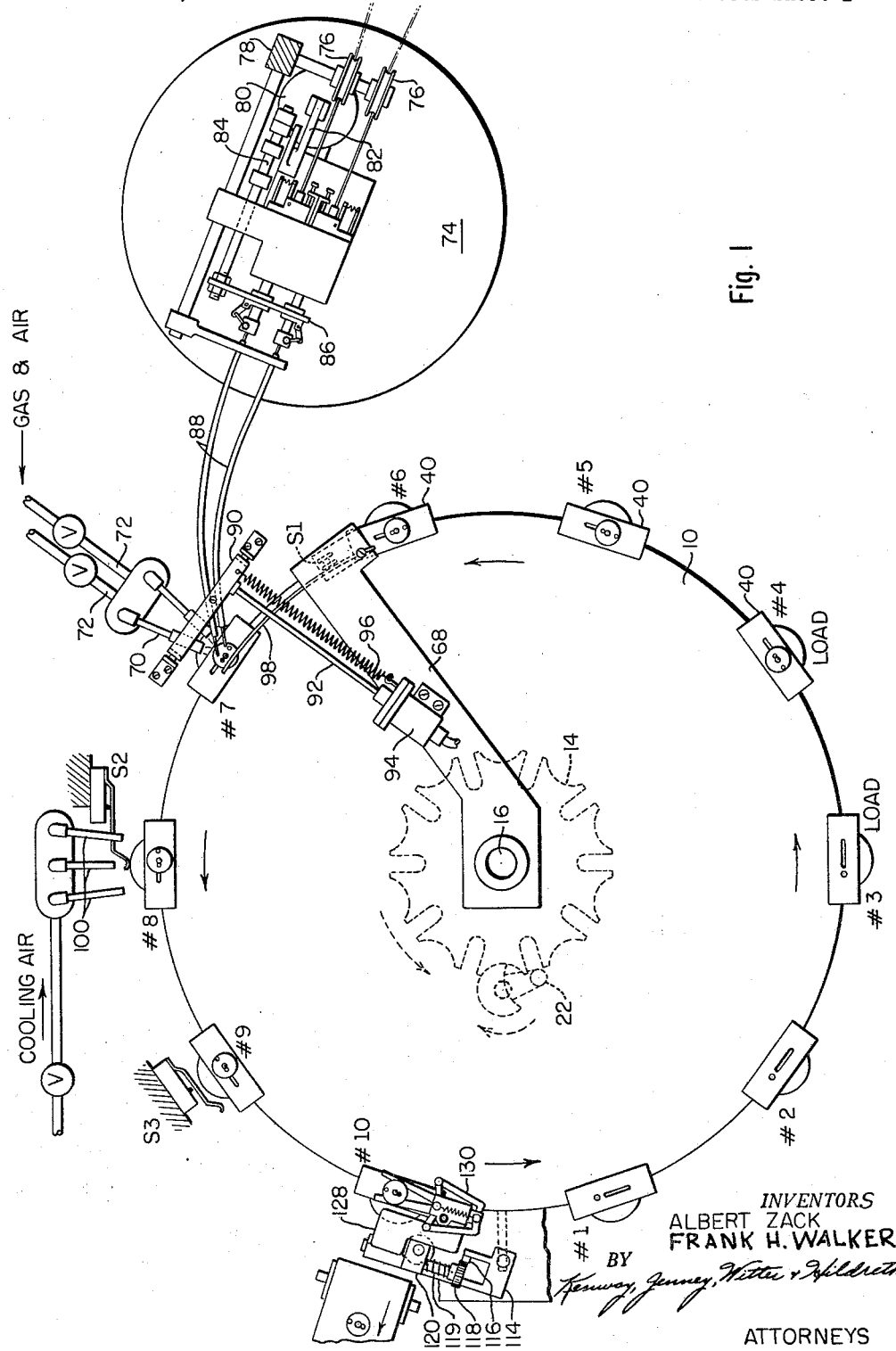

Dec. 26, 1961 F. H. WALKER ET AL 3,014,447
SOLDERING MACHINE AND METHOD
Filed June 8, 1956 7 Sheets-Sheet 1

INVENTORS
ALBERT ZACK
FRANK H. WALKER
BY
ATTORNEYS

INVENTORS
ALBERT ZACK
FRANK H. WALKER

ATTORNEYS

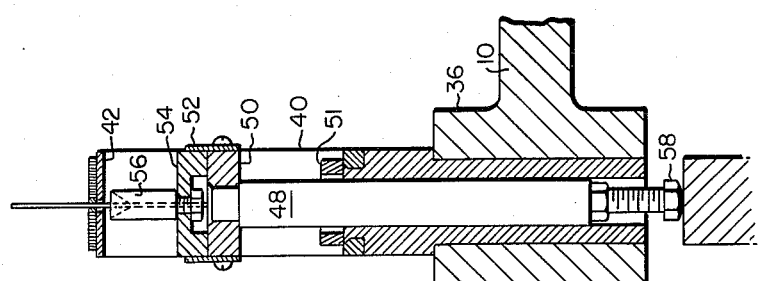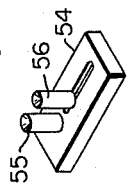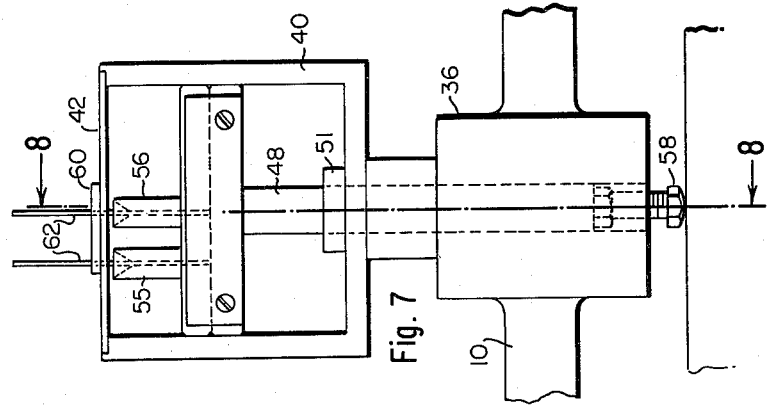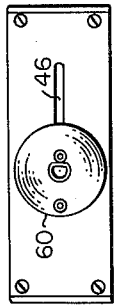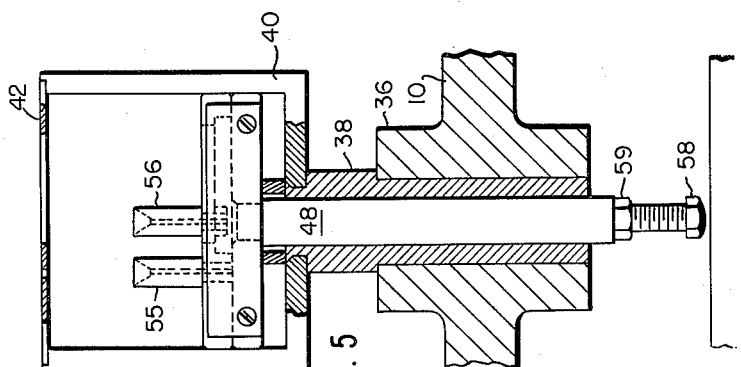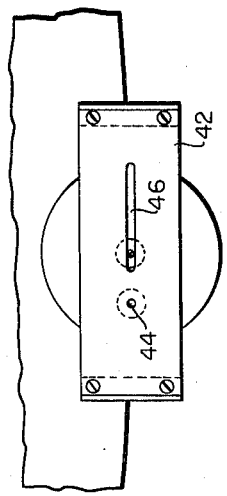

Dec. 26, 1961   F. H. WALKER ET AL   3,014,447
SOLDERING MACHINE AND METHOD
Filed June 8, 1956   7 Sheets-Sheet 4

INVENTORS
ALBERT ZACK
BY FRANK H. WALKER

ATTORNEYS

Dec. 26, 1961    F. H. WALKER ET AL    3,014,447
SOLDERING MACHINE AND METHOD
Filed June 8, 1956    7 Sheets-Sheet 5
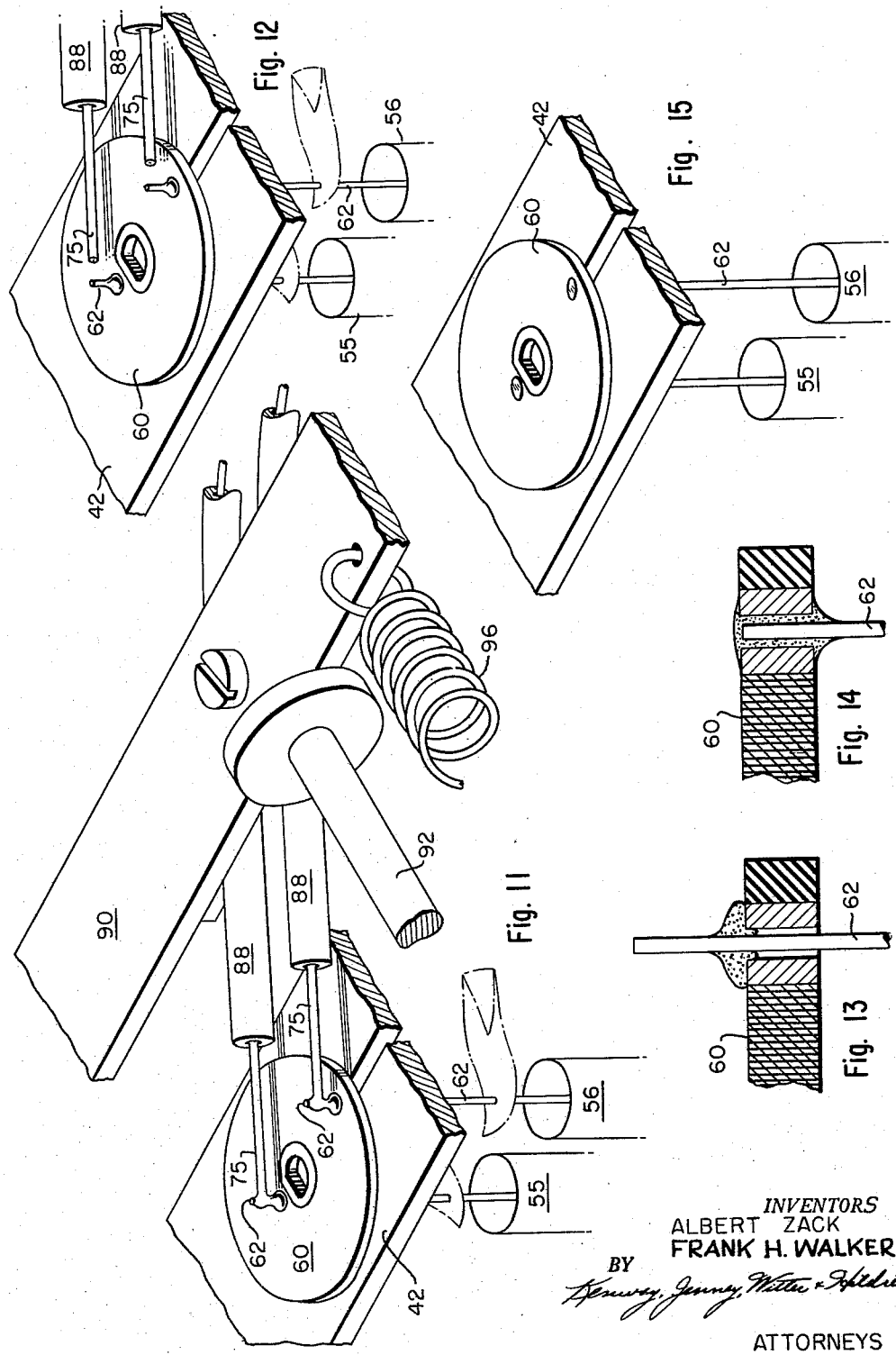
INVENTORS
ALBERT ZACK
FRANK H. WALKER
BY
ATTORNEYS

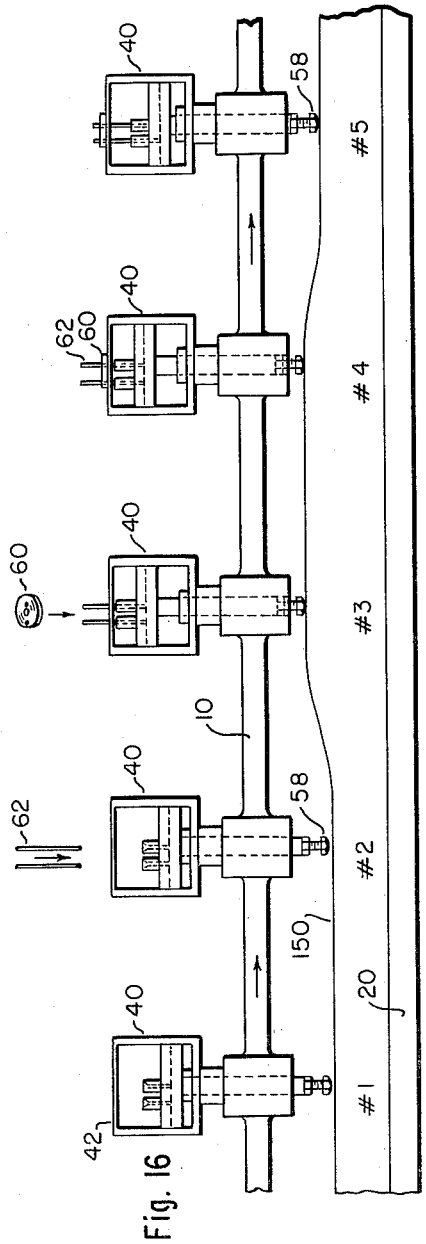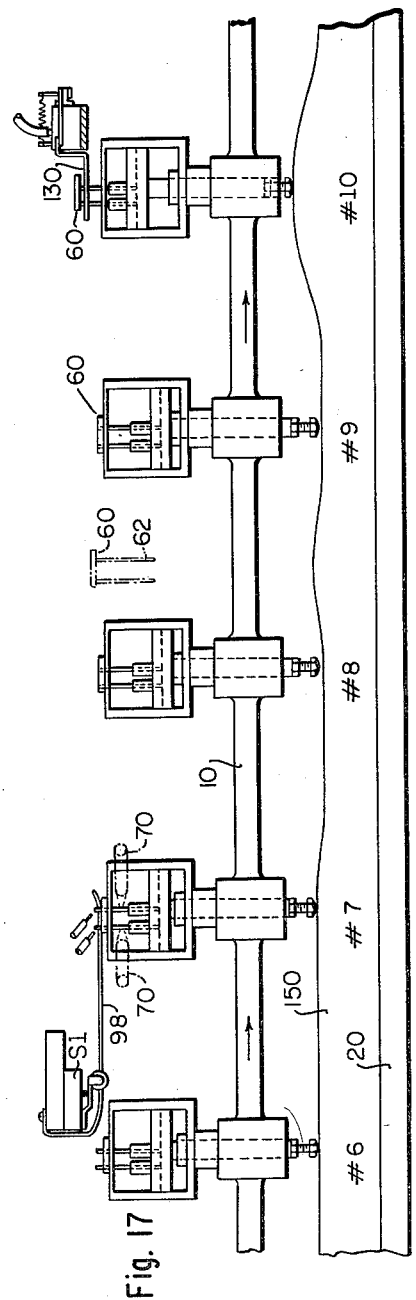

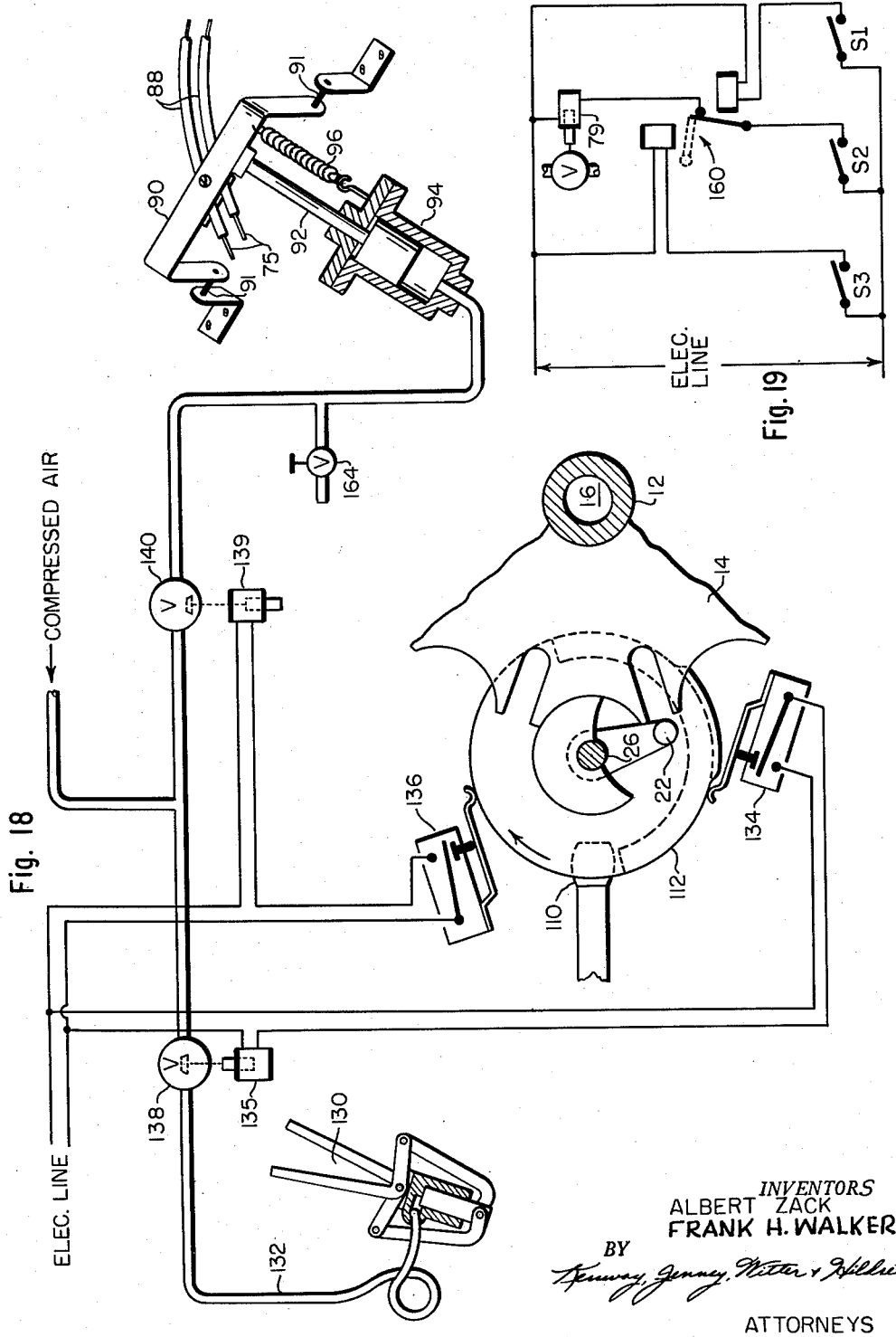

United States Patent Office 3,014,447
Patented Dec. 26, 1961

3,014,447
SOLDERING MACHINE AND METHOD
Frank H. Walker and Albert Zack, Danvers, Mass., assignors, by mesne assignments, to Sylvania Electric Products Inc., Wilmington, Del., a corporation of Delaware
Filed June 8, 1956, Ser. No. 590,126
10 Claims. (Cl. 113—128)

This invention relates in general to electrical components and in particular to a method and apparatus for attaching lead wires to the terminal portions of such components.

Many electrical components such as coils and condensers are constructed of alternating layers of conducting and insulating materials. An interesting and efficient extension of this method of construction is found in the fabrication of so-called wafer coils. Wafer coils are formed by first winding together thin sheets of metal foil and insulating material. The sheets may be of any reasonable width and length depending upon the product ultimately to be made. The rolled body formed by winding is then cut into slices, each slice being a cross-section of the rolled body and constituting a separate wafer coil.

It is the practice in making wafer coils to provide in the rolled body thin tubes, preferably of copper, but other metals have been successfully used. One such tube is secured in firm physical and electrical contact with one end of the conducting metal foil being wound, and the other tube is in similar contact with the other end of the conducting sheet. When tubing is so used, the internal tubular surfaces surround terminal openings near the center of the roll and near the periphery. Thus, when a wafer coil is sliced from the roll, it is possible to solder leads into the terminal openings in order that the coil may be incorporated as a useful device into a circuit.

The soldering operation is usually done manually and is a task which is time-consuming and somewhat difficult especially when wafer coils are of small size. The openings in such wafer coils become extremely small and the leads used are necessarily equally small. Since other fabricating techniques involved in the manufacture of wafer coils have been mechanized to a great extent, the lead-soldering operation constitutes a serious bottleneck, adding to the cost of the final product. A satisfactory solution to this problem would remove a major obstacle presently blocking complete mechanization in producing wafer coils.

A primary object of this invention is to improve the efficiency of manufacturing wafer coils.

Another object of the invention is to reduce the cost of wafer coils resulting from manual processing.

Still another object of the invention is to provide efficient high-speed attachment of leads to wafer coils.

Figure 3:
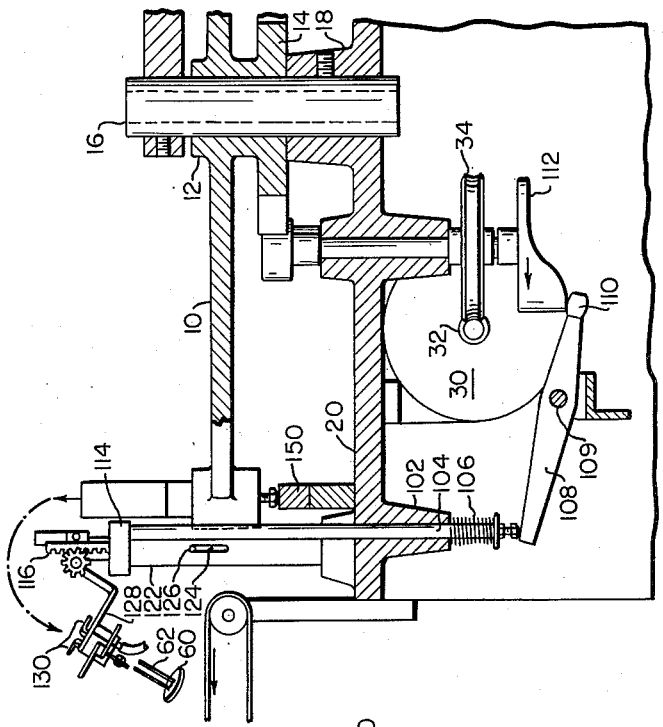
Figure 2:
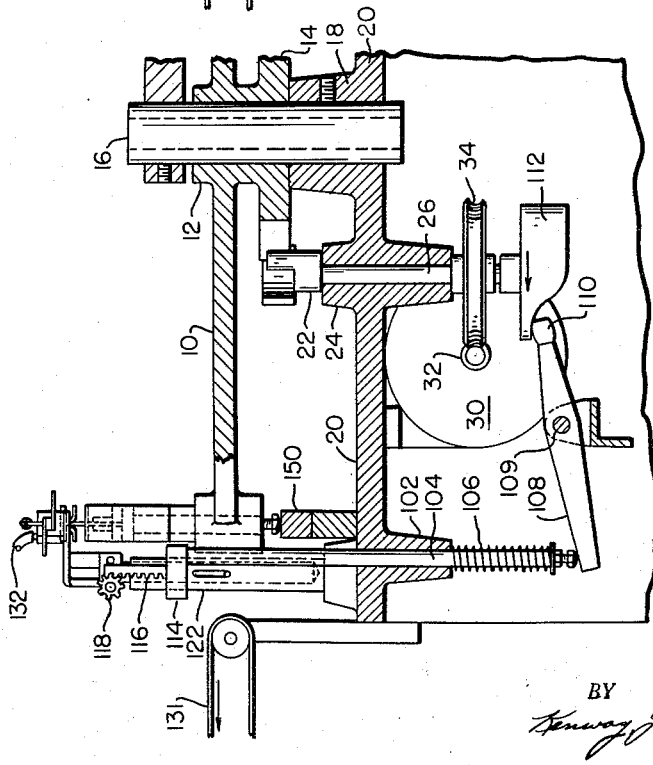
Figure 10:
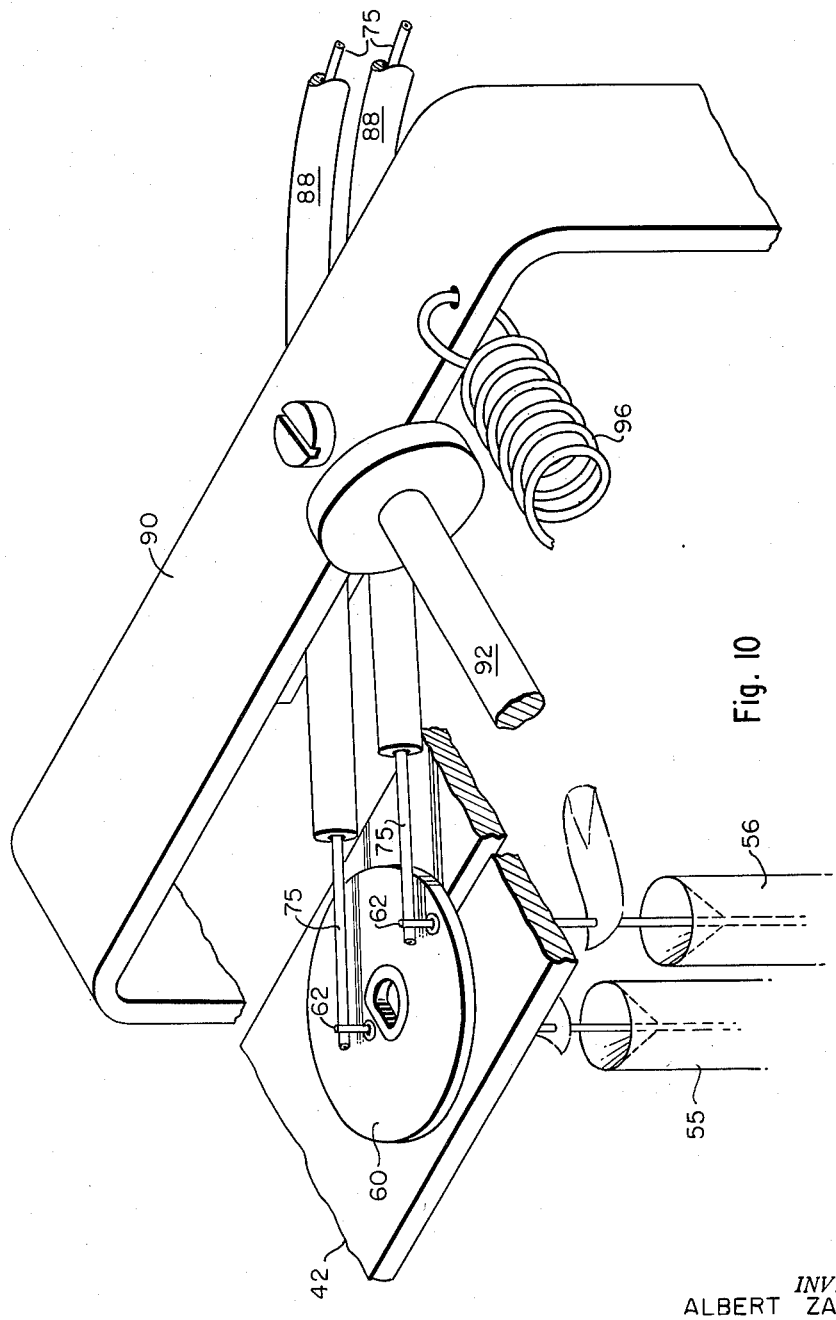

In general, the invention consists in a method and machinery for automatically attaching lead wires to the terminal openings of wafer coils formed by the winding and slicing technique described hereinabove. The machinery includes a rotating turret surrounded by work stations. The turret indexes from one station to the next and sequential operations of loading, soldering, cooling and doffing take place. An important feature of the inventive method is found in the application of solder to the heated lead wires which have been thrust through the terminal openings of the wafer coil. Withdrawal of the leads through the openings until their ends are approximately flush with, or slightly beneath, the upper surface of the wafer coil results in the solder puddling in the openings. Upon cooling, the solder forms an excellent mechanical and electrical joint between the wafer coil and the leads. For a better understanding of the present invention, together with other objects, features and advantages, reference should be made to the following detailed description of a preferred embodiment thereof useful in connection with the fabrication of wafer coils, selected for purposes of illustration and shown in the accompanying drawings in which:

FIG. 1 is a plan view of a machine constructed in accordance with the invention and useful in carrying out the method of the invention, FIGS. 2 and 3 are vertical cross-sections through a portion of the machine illustrating the turret drive and the operation of the doffing mechanism, FIGS. 4 and 6 are plan views of the wafer coil and wire carrier, FIG. 5 is a view in side elevation of the coil and wire carrier, some parts being in cross-section, FIG. 7 is a view in side elevation of the coil and wire carrier showing the wire carriage in upper position, FIG. 8 is a view in cross-section through the coil and wire carrier, FIG. 9 is a view in perspective of the wire supporting members, FIGS. 10, 11 and 12 are views in perspective showing the series of steps performed to solder the wires in place, FIGS. 13 and 14 are views in enlarged cross-section through a coil to show the relative position of the coil and lead wire as the solder is applied and the wire then sinks, FIG. 15 is a perspective view showing the completed soldering operation, FIGS. 16 and 17 are views in side elevation of the carriers and elevating cams at the various stations of the machine, FIG. 18 is a schematic diagram showing the cam-operated switches for operating the air valves controlling the mechanism for reciprocating the bracket holding the solder guides and for operating the jaws of the doffer, and FIG. 19 is a circuit diagram showing the controls for the feeding of the ribbons or wires of solder.

Referring particularly to FIG. 1, there is shown a circular turret 10 supported from and rotatable with a turret hub 12. Periodic rotation is imparted to turret hub 12 through a Geneva gear 14 which is rigidly attached thereto. A stationary shaft 16, which may be hollow to permit central introduction of service lines or for other purposes, provides basic support about which turret 10 and its hub 12 revolve.

Geneva gear 14 obtains its motion from its cooperating Geneva drive member 22. Referring for the moment to FIGS. 2 and 3, a suitable electric motor or other primary source 30 is provided to impart continuous rotary motion to Geneva drive member 22, through a worm 32 and a cooperating worm wheel 34.

A plate 20 is fixed beneath turret 10 and is locked to shaft 16 by means of screws through a boss 18. A second boss 24 offset from boss 18 is formed on plate 20 and provides an internal bearing surface for rotation of a shaft 26 which is driven by worm wheel 34. Locked to the upper end of shaft 26 is Geneva drive member 22.

Referring now to FIGS. 4 and 5, there is shown one of the peripheral bosses 36 on turret 10. In boss 36 is a bushing 38 to which is firmly secured a U-shaped frame 40 and a relatively thin plate 42 for supporting a wafer coil spanning the top of frame 40. A circular opening 44 and a slot 46 are formed in plate 42. A relatively heavy plate 50 is secured to a shaft 48 which is slidable in bushing 38. A spacer 51 is provided between the bottom of frame 40 and plate 50. A rectangular block 54 having a hole and a slot substantially matching in location those found in thin plate 42 is secured to plate 50 by means of screws and thin lateral aligning plates 52. A first hollow tube 55 having a countersunk upper opening is fitted into rectangular block 54 with its opening aligned with the circular opening of block 54. A second hollow tube 56 also having a countersunk upper opening is detachably secured in the rectangular slot of block 54. The threaded lower end of hollow tube 56 and the nut located beneath the slot of block 54 in the undercut area permit adjustment of the location of hollow tube 56. Hollow tubes 55 and 56 are designed as holders for lead wires 62 and the openings therein must be small enough to maintain the leads accurately in position for proper processing and large enough for ease of loading. Adjustment of spacing between holders is provided to accommodate wafer coils of different sizes having terminal openings of different spacings. Attached to the lower end of shaft 48 is a round-headed bolt 58 which serves as a cam follower. A locking nut 59 which bears against shaft 48 provides a measure of adjustment of the extension of bolt 58. In FIGURES 6, 7, 8 and 9 lead wires 62 and a wafer coil 60 are shown in the positions they occupy in the present apparatus.

Reverting to FIG. 1, there is shown a flat bent arm 68 secured to shaft 16 and extending outwardly beyond the periphery of turret 10. Mounted on the extreme end of arm 68 is a switch S1. The actuating lever of S1 is positioned in the path travelled by wafer coils 60 during turret rotation.

A support pedestal 74 carries dispensing apparatus for solder wires 75 which pass over sheaves 76 from reels (not shown). Sheaves 76 are rotatably supported from a bracket 78. A bell crank 82 is connected to the piston of an air cylinder 80 and drives a rod 84. Rod 84 is linked to a gripping and feeding device 86 which upon activation advances solder wires 75 through flexible guides 88. A bracket 90 supports the ends of guides 88, as may be more clearly seen by referring to FIG. 10.

Referring to FIGS. 11 and 12 in conjunction with FIG. 1, gas jets 70, fed by gas and air lines 72 provide gas flames for heating leads 62 at their points of emergence from hollow tubes 55 and 56 below bracket 90. A rod 92 connects bracket 90 to the piston of an air cylinder 94 which is attached to flat arm 68. As may be more clearly seen in FIG. 18, bracket 90 is pivoted on pins 91 from fixed points. A coil spring 96 maintains bracket 90 in position adjacent turret 10 during periods when air cylinder 94 is not actuated. A leaf spring 98 bears on wafer coil 60 to maintain it in position on thin plate 42 during its travel from Station 6 to Station 7 and its rest period at Station 7. A second switch S2 is provided adjacent Station 8 and its lever arm is disposed in the path of peripheral bosses 36 of turret 10.

At Station 8, a cooling device is provided. The cooling device consists of air jets 100 fed by an air line 101. A third switch S3 is provided adjacent Station 9 and its lever arm too is disposed in the path of peripheral bosses 36 of turret 10.

Reverting now to FIGS. 2 and 3, another boss 102 is formed in table 20 adjacent its periphery. A shaft 104 is slidably mounted in a boss 102 and is spring loaded by a coil spring 106 against one end of a lever 108. Lever 108 is pivotally mounted on a shaft 109 and has its other end formed into a cam follower 110 which is maintained in contact with an axial cam 112 by the action of coil spring 106. Cam 112 is mounted beneath worm wheel 34 on shaft 26.

At the upper end of shaft 104 there is mounted a bracket 114 which is slidable on a standard 122. A rack 116 is also attached to bracket 114 and is slidable within standard 122. The excursion of rack 116 is limited by a slot 124 in which a pin 126 attached to rack 116 slides.

A pinion gear 118 meshes with rack 116 and rotates as rack 116 moves reciprocally. Pinion gear 118 is fixed to a bracket 128 which moves in an arc as gear 118 rotates. A doffing device which includes spring-loaded jaws 130 is carried by bracket 128 and is operable to lift coil 60 with soldered leads 62 from carrier plate 42 and deposit it on a conveyor belt 131. A flexible air line 132 is connected to the doffing device. As is clearly shown in FIG. 18, a switch 134 controls by way of a solenoid 135 and a normally closed valve 138 the supply of air to the doffing device and thereby the action of jaws 130. Switch 134 has a lever arm acting as a cam follower on the periphery of cam 112.

Another switch 136 is also actuated by the peripheral surface of cam 112. Switch 136 controls the energization of a solenoid 139 which controls a normally open valve 140. Valve 140 controls the supply of air to air cylinder 94 which moves bracket 90 in and out of position adjacent turret 10 at Station 7.

The general operation of the lead soldering machine is dependent upon an indexing movement of turret 10. The Geneva drive mechanism as seen in FIG. 1 causes turret 10 to rotate periodically and to rest at ten different stations. At each station, turret 10 presents the carriers 40 for the various operations to take place.

In FIGS. 16 and 17 a typical programming of operations is illustrated. The cam surface 150 on plate 20 which is actually a circular track is shown for simplicity in straight lines. At Stations 1 and 2, hollow tubes 55 and 56 are retracted from the spanning plate 42. At Station 3 lead wires 62 are inserted in hollow tubes 55 and 56 at which time hollow tubes 55 and 56 are thrust upwardly to plate 42 by the action of surface 150 on cam follower 58. Wafer coil 60 is dropped over lead wires 62 at Station 4, at which point lead wires 62 protrude upwardly beyond the upper surface of coil 60. The sequence of loading lead wires 62 and wafer coil 60 can, of course, be reversed, or the lead wires 62 may be threaded into coil 60 and the assembly loaded as a unit. Automatic loading is also quite feasible.

At Station 5, cam surface 150 permits dropping of lead wires 62 to a point where they protrude to a lesser degree above the upper surface of wafer coil 60. This condition is maintained at Station 6 and at Station 7 where lead wires 62 are carried into the path of flames from gas jets 70 to be heated. This is clearly shown in FIGS. 11 and 12. Coil 60, in its passage from Station 6 to Station 7 trips a momentary contact switch S1 which energizes a locking relay 160. In the absence of a coil 60 on plate 42, switch S1 is not actuated and locking relay 160 is not energized. The circuit of which these components are a part is shown schematically in FIG. 19. The function of switch S1 and locking relay 160 is to enable subsequent circuits to be operable only when a wafer coil 60 is present on a given carrier plate 42 as will be explained in greater detail hereinafter. A leaf spring 98 maintains wafer coil 60 in position on plate 42. Any tendency to dislodgment by the roller of S1 is thus avoided. Also, during the period wafer coil 60 remains at Station 7, it is retained in place by spring 98.

Surface 150 causes a portion of lead wires 62 to be maintained above the surface of wafer coil 60 as carrier 40 enters Station 7. Assuming that switch S1 has been actuated by the presence of a wafer coil 60, and locking relay 160 has closed, rotation of turret 10 causes subsequent circuits to be energized. Switch S2 is actuated by a protruding peripheral boss 36 thereby closing the circuit of solenoid valve 79. Solenoid valve 79 opens allowing air to reach cylinder 80. As may be seen in FIG. 1, the piston of cylinder 80 moves bell crank 82 which in turn forces rod 84 to move in a direction away from air cylinder 80. Rod 84 is connected directly to gripper and feeder mechanism 86 which tightens on solder wires 75 forcing a predetermined length through flexible guides 88.

During the entry of carrier 40 into Station 7 and for a considerable portion of the turret rest period, bracket 90 is maintained in a position retracted from turret 10. As may be noted from FIG. 18, a valve 140 is normally open permitting air to force the piston of air cylinder 94 forward, which, in turn, maintains retraction of bracket 90 from turret 10. During this period of retraction lead wires 62 are heated to a relatively high temperature by the flames from gas jets 70. Continued rotation of cam 112 causes actuation of switch 136 during the latter half of the rest period, however. At this time, solenoid 139 is energized closing valve 140. Residual air in cylinder 94 and the now closed-off line leading thereto bleeds off through a bleeder valve 164. Spring 96, working against the gradually decreasing back pressure from residual air in cylinder 94, pulls bracket 90 slowly forward toward the lead wires 62. Adjustment is provided on bleeder valve 164 to control the speed of movement of bracket 90.

Thus, cam follower 58 as it travels over surface 150 causes lead wires 62 to be presented to the extended solder wires 75. Bracket 90 moves the solder wires 75 into lateral contact with heated lead wires 62 and the solder, which has self-contained flux, commences to melt as shown in FIG. 11.

Meanwhile, the lever arm of switch 136 completes its travel over the actuating peripheral cam portion of cam 112 and drops back opening the circuit of solenoid 139. Valve 140 drops into its normally open position and air at full line pressure is supplied to air cylinder 94. The piston of air cylinder 94 is then driven forward causing rapid retraction of bracket 90 from turret 10. The unmelted portions of solder wires 75 are thereby withdrawn from lead wires 62, as shown in FIG. 12. The melted portions of the solder because of surface tension gather in balls about lead wires 62 and in the openings in wafer coil 60 as shown in FIG. 13. Wafer coil 60 is heated to some extent by being disposed above flames from gas jets 70. Additional heat sufficient to make a solder joint is transferred from lead wires 62 by the molten solder. Although solder wires 75 are also generally above flames from gas jets 70, they are not melted during indexing of turret 10 because of the relatively fast indexing speed.

Turret 10 now commences to index to its next position. As carrier 40 leaves Station 7 cam follower 58 drops on surface 150 withdrawing lead wires 62 preferably to a point at or just beneath the upper surface of wafer coil 60. The still molten solder about lead wires 62 is drawn into the openings of wafer coil 60 forming complete bonds between lead wires 62 and the inner surfaces of the openings in wafer coil 60. In fact, circular portions of the upper surface of coil 60 about the openings are joined by solder to lead wires 62, and a fillet is formed between circular portions about the openings in the lower surface of coil 60 and lead wires 62. This is clearly shown in FIG. 14 and the entire assembly as sealed is shown in FIG. 15.

As previously noted, switch S1 is a sensing switch which determines the presence or absence of a wafer coil 60 on plate 42. The discussion above of the operation of the solder feeding mechanism is predicated upon the presence of a wafer coil and triggering of switch S1. Referring to FIG. 19, the action of the circuits in the absence of a wafer coil may be seen. Solenoid 79 which operates air cylinder 80 of the solder feeding mechanism is in series circuit relationship with the power line, locking relay 160 and switch S2. When switch S1 is not thrown, locking relay 160 will not close and actuation of S2 by a peripheral boss 36 of turret 10 is ineffective to close the circuit.

Switch S3 is so disposed adjacent turret 10 that with rotation of turret 10 as a given carrier leaves Station 9, a peripheral boss 36 trips S3. As shown in the schematic FIG. 19, when a wafer coil is present switches S1 and S2 have been tripped, and locking relay 160 has closed. In these circumstances tripping of switch S3 causes the release of the locking plate of locking relay 160 which permits the relay contacts to open. The circuit is now restored to its original condition and the sequence of operations can be initiated again only by tripping of S1 by a wafer coil. Action of switch S3 is of no consequence, of course, in the absence of a wafer coil.

Referring again to FIG. 17, it may be seen that as carrier 40 leaves Station 7 and the lead wires 62 have become soldered in position at or just beneath the upper surface of wafer coil 60, the surface 150 is quite flat to prevent any disturbance of the still plastic solder joints. At Station 8, air jets 100 are disposed to blow streams of cooling air on the solder joints between lead wires 62 and coil 60. At the next index of turret 10, lead wires 62 and the now firmly soldered wafer coil 60 are lifted by elevated portion of surface 150 between Stations 8 and 9. This lifting breaks any adherence of coil 60 to plate 42 which might occur because of flux seals or slight solder flow between the two. As the carrier 40 reaches Station 9, the coil 60 and lead wires 62 are returned to their rest position on plate 42 by the action of surface 150. Finally, as the carrier 40 is being indexed into Station 10, a relatively high portion of surface 150 causes the coil 60 and lead wires 62 to be lifted considerably above plate 42 to provide clearance for the jaws 130 of the doffing apparatus.

Referring to FIGS. 2 and 3, the operation of the doffing apparatus may be seen. Cam 112 is cut away axially over a substantial portion of its periphery. Cam follower 110 is spring loaded into continuous contact with the axial surface of cam 112 by means of spring 106. In FIG. 2, turret 10 may be considered to be in motion and about to come to rest. Under such conditions, shaft 104 is in a downwardly retracted position by reason of the action of spring 106. The jaws 130 of the doffing mechanism lie in a plane just above plate 42, but beneath that of coil 60. As turret 10 rotates, a coil 60 is brought in by carrier 40 and comes to rest with lead wires 62 between jaws 130.

As rotation of cam 112 continues, cam follower 110 is forced downwardly by the axial cam surface. Shaft 104 moves upwardly carrying bracket 114 and rack 116 upwardly as guided by standard 122. Pinion gear 118 rotates carrying bracket 128 in an arc which lifts coil 60 and attached leads 62 from plate 42 and deposits the assembly on conveyor 131. To insure positive holding of coil 60 and lead wires 62, the jaws 130 of the doffing device are air controlled in a manner outlined below.

Referring again to FIG. 18, switch 134 is in series circuit relationship between the incoming power line and solenoid 135. When switch 134 is tripped and held closed by the peripheral surface of cam 112, solenoid 135 is energized and normally closed valve 138 is opened. This permits air to flow through flexible line 132 to the cylinder of jaws 130 causing them to close on lead wires 62. After the doffing mechanism has swung in its arc, the relatively short protruding peripheral portion of cam 112 rotates beyond the lever arm of switch 134, allowing the arm to drop back. Solenoid 135 becomes deenergized, valve 138 returns to its normally closed position and jaws 130 open. Similarly, further rotation of cam 112, as seen in FIG. 3 permits cam follower 110 to rise, shaft 104 and rack 116 to drop and rotation of pinion gear 118 swings the doffing mechanism back to its normal position with jaws 130 poised in a plane above plate 42 of carrier 40 ready to repeat its operation on the next wafer coil.

What has been described constitutes a preferred embodiment of the present invention useful in the production of wafer coils. However, reorientation of parts of the apparatus described, setting of the coils or lead wires in different positions, or substitutions of equivalent mechanisms for those disclosed will suggest themselves to those skilled in the art. Similarly, substitution of equivalents for several of the method steps may be feasible. By way of example, wafer coil 60 need not be in a horizontal plane with lead wires 62 being withdrawn vertically. Solder will flow between the two without aid from gravity. Also, lead wires 62 need not be drawn entirely into the openings of wafer coil 60, such procedure being preferred but not necessary to the invention. These and other similar substitutions are believed to fall within the purview of the present invention which should be limited only by the spirit and scope of the appended claims.

What is claimed is:

1. Apparatus for attaching a lead wire to a wafer coil having an opening therethrough comprising, means for supporting said wafer coil in a position such that said opening is in a vertical plane, means for retaining said lead wire within said opening, means for applying heat to a portion of said lead wire remaining below said wafer coil, means for bringing solder into contact with a portion of said lead wire extending above said wafer coil until said solder melts, means for retracting said lead wire and said molten solder substantially into said opening, and means for cooling said solder to form a bond between said lead wire and said wafer coil.

2. Apparatus for attaching a lead wire to a wafer coil having an opening therethrough, comprising a plate for supporting said wafer coil, a reciprocating holder for supporting said lead wire, means for actuating said reciprocating holder to permit the opening in said wafer coil to pass over and beyond a first portion of said lead wire, means for applying heat to said lead wire, means for applying solder to said first portion of said lead wire until said solder melts, means for actuating said reciprocal holder to withdraw said first portion of said lead wire and molten solder substantially into said opening in said wafer coil, and means for cooling said molten solder to form a bond between said lead wire and said wafer coil.

3. Apparatus for attaching a lead wire to a wafer coil having an opening therethrough comprising a movable carrier including a plate for supporting said wafer coil in a generally horizontal position, a reciprocating holder for supporting said lead wire in a generally horizontal position, means for moving said carrier periodically from one rest position to another, means fixed in position relative to said movable carrier and responsive to movement of said carrier for actuating said reciprocating holder to raise said lead wire to permit threading of said opening in said wafer coil over said lead until a first portion thereof extends above said wafer coil as said carrier approaches a rest position, means for applying heat to said lead wire at said rest position, means for applying solder to said first portion of said lead wire until said solder becomes molten, further movement of said carrier causing withdrawal of said lead wire and molten solder substantially into said opening as said reciprocating holder is lowered by said actuating means, and means for cooling said molten solder to form a bond between said lead wire and said wafer coil.

4. Apparatus for attaching a lead wire to a wafer coil having at least a terminal opening therethrough comprising a movable carrier including a plate for supporting a wafer coil in a generally horizontal position, a holder for supporting said lead wire in a generally vertical position, means for moving said carrier periodically from one rest position to another, a cam fixed in position relative to and responsive to movement of said carrier to raise and lower said holder and said lead wire, said cam being arranged to raise said lead wire through said opening until a first portion thereof extends above said coil at a given rest position of said carrier, means for applying heat to said lead wire at said given rest position, means adjacent said movable carrier for bringing solder into contact with said first portion of said lead wire at said given rest position, means for withdrawing said lead wire and molten solder into said opening in response to action of said cam as said carrier is moved from said given rest position, means adjacent said movable carrier for cooling said solder to form a bond between said lead wire and said coil, and means for lifting said assembled coil and lead wire from said plate.

5. Apparatus for attaching lead wires to a wafer coil having terminal openings comprising, a rotatable turret, means for rotating said turret, a plurality of carriers mounted on and about the periphery of said turret, each said carrier including means for retaining said wafer coil in a fixed position thereon and holders for said lead wires, a heating device, a solder feeding device, a cooling device and a doffing device disposed adjacent said turret, and a programming mechanism controlled by rotation of said turret whereby said lead wires are passed through said openings in said wafer coil, heated by said heating device, contacted by solder from said solder feeding device and withdrawn substantially into said openings, molten solder forming between each of said lead wires and the interior walls of its respective opening, further rotation of said turret presenting said wafer coil and lead wires to said cooling device whereby said coil and leads are bonded together by hardening of said solder, still further rotation of said turret presenting said coil and lead wires to said doffing device for removal from said carrier.

6. Apparatus as in claim 5 including means for locking one of said holders for said lead wires in any one of a range of fixed positions relative to the other of said holders.

7. Apparatus as in claim 5 including a switch and circuit for disabling said solder feeding device in the absence of a wafer coil on a carrier being presented at said solder feeding device.

8. Apparatus for attaching lead wires to a wafer coil having terminal openings, comprising a rotatable turret, a plurality of carriers disposed upon and about said turret, each said carrier including a plate for supporting a wafer coil and holders for supporting said lead wires, means for adjusting the spacing between said holders, a cam surface fixed with respect to said rotatable turret for controlling the height of said lead wires with respect to said coil, a cam follower, a shaft connecting said cam follower to said holders, means for adjusting the length of said shaft, means for periodically rotating said turret to move said carriers mounted thereon through a predetermined path, means disposed adjacent a fixed point in said path for heating said lead wires, means also adjacent said fixed point for applying solder to said lead wires, movement of said cam follower over said cam surface in response to said rotation of said turret retracting said lead wires and molten solder into said openings, and means disposed adjacent a second point in said path for cooling said solder to form a bond between said lead wires and said coil.

9. Apparatus for securing lead wires to wafer coils having terminal holes, comprising a carrier including a plate for supporting a wafer coil in horizontal position, and a carriage for lead wires mounted for vertical reciprocation beneath the plate, a turret mounted for rotation and supporting said carrier and said carriage, means for periodically rotating said turret, a cam disposed beneath the turret for reciprocating said carriage in response to movement of said turret to control the height of the lead wires with respect to the coil, a plurality of stations about said turret, means at one station for applying heat to lead wires beneath said plate, means at the same station for presenting ribbons of solder, said cam being arranged to lift the lead wire carriage until the wires project above the surface of the coil into position to encounter the solder ribbons and for dropping the carriage as the turret moves the carrier past said same station, and means at another station for doffing assembled coils and wires, said cam being arranged at said other station to lift the wire carriage into position to encounter the doffing means.

10. Apparatus for attaching lead wires to wafer coils having terminal openings comprising a base plate, a turret rotatable relative to said base plate, a cam surface disposed on said base plate, a plurality of carriers mounted on said turret and disposed symmetrically about the periphery thereof, means for rotating said turret periodically to present said carriers sequentially at a like plurality of stations, each said carrier including a plate for supporting a wafer coil in a horizontal position and a pair of holders for supporting said lead wires in a vertical position, means responsive to movement of said turret with respect to said cam surface for reciprocally moving said holders in a vertical plane, a device for heating said lead wires disposed at one of said stations, a solder feeding device also disposed at said one of said stations, said cam surface being arranged to raise said holders and said lead wires in response to movement of said carrier into said one of said stations, said lead wires being raised until first portions thereof extend through said openings above said wafer coil, portions of said lead wires below said wafer coil being disposed before said heating device, means for moving said solder feeding device to said turret to bring said solder into contact with said first portions of said lead wires after said lead wires are raised in temperature by said heating device, means for retracting said solder feeding device after a predetermined quantity of solder has been melted against each of said lead wires, said cam surface being so arranged that movement of said carrier away from said one of said stations causes dropping of said holders and gradual withdrawal of said lead wires substantially into said openings, molten solder gathering about said leads and substantially filling the space between said leads, and the walls of said openings, a source of cooling air at a second of said stations, further movement of said carrier into said second of said stations presenting said wafer coil and lead wires to said cooling air, whereby said solder becomes hardened forming bonds between said lead wires and said openings, and a doffing mechanism disposed adjacent a third of said stations, said cam surface being so arranged that further movement of said carrier toward said third of said stations elevates said assembled coil and lead wires to encounter said doffing mechanism.

References Cited in the file of this patent
UNITED STATES PATENTS

| | | |
|---|---|---|
| 779,526 | Cerruti | Jan. 10, 1905 |
| 2,033,122 | Cornell | Mar. 10, 1936 |
| 2,038,525 | Cate | Apr. 28, 1936 |
| 2,220,741 | Thorson | Nov. 5, 1940 |
| 2,390,890 | MacFarland | Dec. 11, 1945 |
| 2,672,838 | Heidenreich et al. | Mar. 23, 1954 |